United States Patent
Bhatwadekar et al.

(10) Patent No.: US 11,636,119 B2
(45) Date of Patent: Apr. 25, 2023

(54) SYSTEM AND METHOD FOR EFFICIENT MANAGEMENT OF A SEARCH DATABASE FOR RETRIEVING CONTEXT-BASED INFORMATION

(71) Applicant: Innoplexus AG, Eschborn (DE)

(72) Inventors: Prashant Bhatwadekar, Pune (IN); Rohit Anurag, Bokaro (IN)

(73) Assignee: INNOPLEXUS AG, Eschborn (DE)

(*) Notice: Subject to any disclaimer, the term of this patent is extended or adjusted under 35 U.S.C. 154(b) by 128 days.

(21) Appl. No.: 17/325,685

(22) Filed: May 20, 2021

(65) Prior Publication Data
US 2022/0374437 A1  Nov. 24, 2022

(51) Int. Cl.
G06F 16/00 (2019.01)
G06F 16/2457 (2019.01)
G06F 40/30 (2020.01)
G06F 16/22 (2019.01)

(52) U.S. Cl.
CPC ...... G06F 16/24575 (2019.01); G06F 16/221 (2019.01); G06F 40/30 (2020.01)

(58) Field of Classification Search
CPC .. G06F 16/24575; G06F 16/221; G06F 40/30; G06F 16/367
See application file for complete search history.

(56) References Cited

U.S. PATENT DOCUMENTS

| | | | | |
|---|---|---|---|---|
| 6,675,159 B1 * | 1/2004 | Lin | | G06F 16/353 |
| 8,041,702 B2 * | 10/2011 | Eggebraaten | | G06F 16/367 |
| | | | | 707/738 |
| 2006/0053171 A1 * | 3/2006 | Eldridge | | G06F 16/358 |
| | | | | 707/999.203 |
| 2009/0083257 A1 * | 3/2009 | Bargeron | | G06F 16/48 |
| | | | | 707/999.005 |
| 2010/0299367 A1 * | 11/2010 | Chakrabarti | | G06F 16/24578 |
| | | | | 707/769 |
| 2015/0227589 A1 * | 8/2015 | Chakrabarti | | G06F 16/24564 |
| | | | | 707/748 |
| 2016/0012336 A1 * | 1/2016 | Franceschini | | G06F 16/3334 |
| | | | | 706/55 |
| 2016/0179945 A1 * | 6/2016 | Lastra Diaz | | G06F 16/284 |
| | | | | 707/739 |
| 2017/0139996 A1 * | 5/2017 | Marquardt | | G06F 16/2272 |

(Continued)

*Primary Examiner* — Leslie Wong
(74) *Attorney, Agent, or Firm* — Ziegler IP Law Group, LLC

(57) ABSTRACT

A system and method for efficient management of a search database for retrieving context-based information, system including a database and processor, wherein the database includes columnar database for storing a plurality of documents, an ontological database configured to represent a plurality of concepts as nodes in a network and relationships between the concepts as edges between nodes and the search database configured to store an inverted index of the plurality of documents in the columnar database. Herein, the processor is configured to identify, using the ontological database, a set of concepts in each of the plurality of documents and store, in the search database, corresponding to a given document the set of concepts identified in the given document, and secondary concepts relating to the given document, wherein a secondary concept has a direct relationship in the network with at least one of the concepts in the set.

11 Claims, 2 Drawing Sheets

(56) References Cited

U.S. PATENT DOCUMENTS

| | | | |
|---|---|---|---|
| 2018/0060401 A1* | 3/2018 | Farh | G06F 16/24575 |
| 2019/0278777 A1* | 9/2019 | Malik | G06F 16/24578 |
| 2021/0103586 A1* | 4/2021 | Quamar | G06N 5/02 |
| 2021/0133172 A1* | 5/2021 | Böhme et al. | G06F 16/2453 |
| 2021/0174906 A1* | 6/2021 | Ul Ain | G16B 50/30 |
| 2022/0129556 A1* | 4/2022 | Chen | G06V 10/40 |
| 2022/0269927 A1* | 8/2022 | Rice | G06F 40/20 |

* cited by examiner

SYSTEM AND METHOD FOR EFFICIENT MANAGEMENT OF A SEARCH DATABASE FOR RETRIEVING CONTEXT-BASED INFORMATION

TECHNICAL FIELD

The present disclosure relates generally to management of database; and more specifically, to systems and methods for efficient management of search databases for retrieving context-based information.

BACKGROUND

In recent years, the data related to biomedical entities has grown exponentially. Additionally, the data has inter-hierarchical connections along with intra-hierarchical connections. Furthermore, system level database functionalities comprise data dictionary management, data storage management, data security management, backup and recovery management, database communication interfaces, database access languages and application programming interfaces, easy search Interface, attribute relationship Interface, graph ontology environment with version control, and so forth. Hence, a database management managing the data should serve all the system level database functionalities.

However, performing aggregation, search and insertion of data in a single common platform results in heap issues and performance bottlenecks. Furthermore, proper integration of ontology and raw data is not possible in existing databases. In order to perform a change in the ontology and raw data, the whole raw data needs to be reinserted again. Subsequently, repeated inverted index is required for different search types of functionality which often leads to duplication of data storage in indexes. Additionally, limited scalability is persistent in existing databases. Hence, small ontology is easily supported but as the ontology is scaled, the cost of the server increases with respect to the scaling of ontology and the ontological database is not able to scale. Furthermore, indexing of data for search purposes is slow due to extra processing time consumed for tagging using ontology. Notably, using only one type of database engine to perform different database functionalities create overhead in the cost of complexity.

Therefore, in light of the aforementioned drawbacks, there exists problems associated with conventional data management methods.

SUMMARY

The present disclosure seeks to provide a system for efficient management of a search database for retrieving context-based information. The present disclosure also seeks to provide a method of retrieving context-based information relating to a search query. An aim of the present disclosure is to provide a solution that overcomes at least partially the problems encountered in prior art.

In one aspect, the present disclosure provides a system for efficient management of a search database for retrieving context-based information, the system comprising a database and a processor,
wherein the database comprises:
a columnar database for storing a plurality of documents;
an ontological database configured to represent a plurality of concepts as nodes in a network and relationships between the concepts as edges between the nodes; and
the search database configured to store an inverted index of the plurality of documents in the columnar database;
wherein the processor is configured to identify, using the ontological database, a set of concepts in each of the plurality of documents and store, in the search database, corresponding to a given document:
the set of concepts identified in the given document; and
secondary concepts relating to the given document, wherein a secondary concept has a direct relationship in the network with at least one of the concepts in the set.

In another aspect, the present disclosure provides a method of retrieving context-based information relating to a search query, wherein the method is implemented using a database, the database comprising:
a columnar database for storing a plurality of documents,
an ontological database configured to represent a plurality of concepts as nodes in a network and relationships between the concepts as edges between the nodes, and
a search database configured to store an inverted index of the plurality of documents in the columnar database, wherein the inverted index stores, corresponding to a given document a set of concepts identified in the given document, and secondary concepts relating to the given document, wherein a secondary concept has a direct relationship in the network with at least one of the concepts in the set;
wherein the method comprises
receiving the search query;
identifying at least one concept relating to the search query, using the ontological database; and
identifying at least one document, from the columnar database, relating to the search query based on the at least one concept relating to the search query.

Embodiments of the present disclosure substantially eliminate or at least partially address the aforementioned problems in the prior art, and establishes communication and networking between the columnar database the ontological database and the search database with reduced overhead and no increase in cost with complexity.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
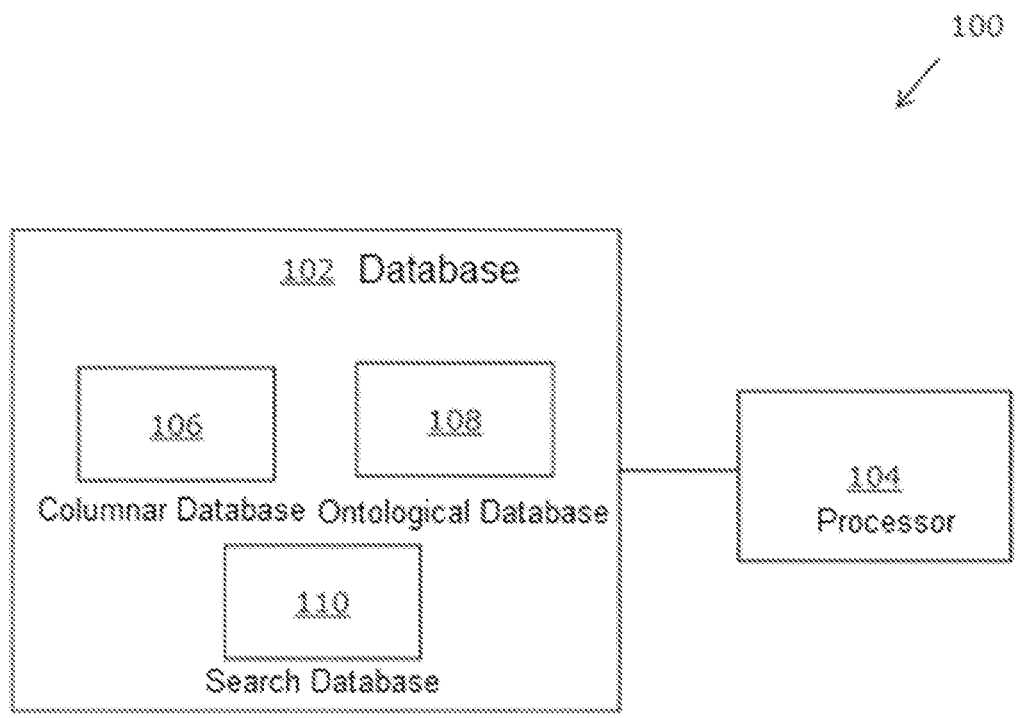
FIG. 1 is a block diagram of a system for efficient management of a search database for retrieving context-based information, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, the present disclosure provides a system for efficient management of a search database for retrieving context-based information, the system comprising a database and a processor,
wherein the database comprises:
a columnar database for storing a plurality of documents;
an ontological database configured to represent a plurality of concepts as nodes in a network and relationships between the concepts as edges between the nodes; and
the search database configured to store an inverted index of the plurality of documents in the columnar database;
wherein the processor is configured to identify, using the ontological database, a set of concepts in each of the plurality of documents and store, in the search database, corresponding to a given document:
the set of concepts identified in the given document; and
secondary concepts relating to the given document, wherein a secondary concept has a direct relationship in the network with at least one of the concepts in the set.

In another aspect, an embodiment of the present disclosure provides a method of retrieving context-based information relating to a search query, wherein the method is implemented using a database, the database comprising:
a columnar database for storing a plurality of documents,
an ontological database configured to represent a plurality of concepts as nodes in a network and relationships between the concepts as edges between the nodes, and
a search database configured to store an inverted index of the plurality of documents in the columnar database, wherein the inverted index stores, corresponding to a given document a set of concepts identified in the given document, and secondary concepts relating to the given document, wherein a secondary concept has a direct relationship in the network with at least one of the concepts in the set;
wherein the method comprises
receiving the search query;
identifying at least one concept relating to the search query, using the ontological database; and
identifying at least one document, from the columnar database, relating to the search query based on the at least one concept relating to the search query.

The system and method of the present disclosure aim to provide a system described herein that may be employed for system level database functionalities comprising data dictionary management, data storage management, data security management, backup and recovery management, database communication interfaces, database access languages and application programming interfaces, easy search interface, attribute relationship interface, graph ontological database environment with version control, and so forth. Furthermore, the present disclosure resolves heap issues and performance bottlenecks observed when a single common platform performs aggregation, search and insertion of data. Additionally, the present disclosure ensures proper integration of ontological database and raw data. Notably, the whole raw data need not be reinserted again in order to perform a change in ontological database and raw data. Subsequently, the present disclosure prevents duplication of data storage in indexes while performing repeated inverted index for different types of system level database functionalities. Additionally, the present disclosure resolves limited scalability persistent in existing databases. Moreover, the cost of the server is economical as the ontological database is scaled. Furthermore, the processing time required for tagging using ontological database while indexing of data for search purposes is not time consuming. Notably, the present disclosure uses the columnar database, the ontological database and the search database to perform different database functionalities hence preventing the creation of overhead in the cost of complexity.

Pursuant to the embodiments of the present disclosure the system described herein relates to the creation of a database system which has the practical implementation of basic life science data. Moreover, in recent years, this data is growing exponentially. Furthermore, the data possesses inter-hierarchical connection and intra-hierarchical connection. Additionally, the present disclosure enables system level database functionalities such as data storage management, data security management, backup and recovery management, database communication interfaces, database access languages and application programming interfaces, easy search interface, and so forth. Hence, the present disclosure undertakes a systematic approach with precomputation and other preprocesses of raw data and provide with the final result.

Throughout the present disclosure, the term "database" as used herein relates to an organized body of digital information regardless of the manner in which the data or the organized body thereof is represented. Optionally, the database may be hardware, software, firmware and/or any combination thereof. For example, the organized body of related data may be in the form of a table, a map, a grid, a packet, a datagram, a file, a document, a list or in any other form. The database includes any data storage software and systems. Optionally, the database may be operable to support relational operations, regardless of whether it enforces strict adherence to the relational model, as understood by those of ordinary skill in the art.

The database comprising a columnar database configured for storing a plurality of documents. Herein, the columnar database is used to store terabytes of raw data which can support functionality of index lookup and persistent storage. Herein, the document is a description of an electronic copy and may be in a form of a web page, internet document, multimedia file and so forth. Additionally, document may be a set of information related to the biomedical entity, object and so forth. Herein, the raw data may be crawled and cleaned through a module which interacts with the database and is stored in the columnar database.

Throughout the present disclosure, the term "ontological database" relates to a database storing set of concepts (namely, information, ideas, data, semantic associations and so forth) that elaborate types and properties of the set of concepts and semantic associations established therebetween. Specifically, the ontological database provides information on relations of certain concepts in a specific field to one or more concepts in other fields. Furthermore, the ontological database provides a base for extracting contextually (namely, conceptually) relevant information pertaining to the specific field required by the user. Additionally, the ontological database provides a structured, optimal and relevant set of concepts pertaining to the specific field required by the user. Moreover, developing the ontological database provides significant outcome for conducting scientific research, academic studies, market analysis and so forth. Optionally, the ontological database may include concepts in form of text, image, audio, video, or any combination thereof.

The database comprising an ontological database configured to represent a plurality of concepts as nodes in the network and relationships between the concepts as edges between the nodes. Herein, the term "concept" refers to a keyword in a given domain that may be a single word or a phrase. Furthermore, the concept may be a synonym, an alternate form and/or other closely related terms generally used interchangeably with the preferred concept. Additionally, the concept maybe arranged hierarchically by subject categories with the more specific concept arranged beneath the broader concept. Optionally, the ontological database is used to store the Life Science ontological database which has multiple nodes and edges. Specifically, the ontological database may help in finding the relationship of top biomedical entity concepts. Notably, the ontological database stored in hierarchical form and/or relationships. Subsequently, the hierarchical and graphical knowledge is used to enhance the mechanism of information retrieval and finding the relationship among top concepts. Additionally, it helps in insight generation from vast amount of information.

In an embodiment, the ontological database is configured to store the plurality of concepts related to a biomedical domain. The plurality of concepts may be biomedical entities. Herein, the term "biomedical entities" refers to a therapeutic data unit related to biomedical sciences. Notably, the biomedical entities have an association therebetween based on functional aspect thereof. For example, the biomedical entity 'Nexium' may be used to reduce production of stomach acid in human body, wherein 'stomach acid' may be another biomedical entity. Furthermore, the biomedical entities and associations thereof are analysed to determine diagnosis, monitoring and therapy of a specific disease associated thereto. Additionally, the biomedical entities are mapped with related one or more biomedical entities in order to identify associations therebetween.

Optionally, the ontological database is configured to store, corresponding to each of the relationships between the concepts, a weightage score of the relationship. Herein, the weightage score of a given relationship is indicative of an importance of the relationship. Notably, a relationship with a high weightage score between two concepts represents that said two concepts are closely interlinked. The weightage score of a relationship between two concepts may be determined based on frequency of occurrence of said two concepts in the plurality of documents. Notably, the ontological database is represented in a tree network topology as the network. Herein, the tree network topology is a special type of structure where many connected concepts are arranged like the branches of a tree. Furthermore, there can be only one connection between any two connected nodes.

In an embodiment, the database is developed in Golang which helps in networking among the database engines for data sharing. Herein, Golang is a statically typed, compiled programming language that provides a lightweight interface to a row-oriented database. Furthermore, the present disclosure is used for database recovery, maintaining consistency, fast transfer of data, lookup, create, read, update, and delete (CRUD) operations.

The database comprising a search database configured to store an inverted index of the plurality of documents in the columnar database. Herein, the raw data from the columnar database is analyzed using the ontological database to identify concepts in each of the plurality of documents and the resultant data is indexed using the search database. Subsequently, the concepts are tagged and stored as an inverted index in the search database. Notably, the tagging of the concepts is performed simultaneously while moving the data from columnar database to the search database with the help of ontological database.

In an embodiment, the present disclosure performs auto scaling by the columnar database, the ontological database and the search database using their own mechanism, wherein the database maintains a stable throughput which each of the database can handle. Herein, throughput is data per second travelling to the columnar database, the ontological database and the search database. Furthermore, uniform database query language module is written in the database which helps in interaction with external users such as for CRUD, search operations and so forth. Optionally, a dashboard is developed which takes the input from the database in real time to continuously monitor the health of the system. Subsequently, the logs of all the three databases are compiled and analyzed by the columnar database, the ontological database and the search database and a common log gets generated, which can be visible in the dashboards in a better visualization.

Throughout the present disclosure, the term "processor" may include, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor may refer to one or more individual processors, processing devices and various elements associated with a processing device that may be shared by other processing devices. Optionally, the processor is configured to establish communication and networking between the columnar database, the ontological database and the search database.

The processor is configured to identify using the ontological database, a set of concepts in each of the plurality of documents and store in the search database corresponding to a given document, the set of concepts identified in the given document and secondary concepts relating to the given document. Notably, a secondary concept has a direct relationship in the network with at least one of the concepts in the set. In an instance, the set of concepts identified in a given document may be 'lung cancer', 'EGFR', 'Tylenol'. The concept 'lung cancer' may have a secondary concept relating thereto such as 'Docetaxel'. Therefore, the secondary concept 'Docetaxel' is also stored with the given document in the search database.

Optionally, the processor is operable to decouple metadata corresponding to each of the plurality of documents from the plurality of documents, wherein the metadata corresponding to the documents is stored in the search database. Notably, in generic search engines the plurality of documents and metadata relating thereto are coupled and stored together. The present disclosure decouples the meta data and the plurality of documents and stores the meta data into the search database and the plurality of documents into the columnar database. Therefore, duplication of data is avoided and leads to storage optimization. Furthermore, in case there is any change in schema of data, wherein schema represents the logical configuration of all or parts of the database, the changed data is not needed to be reindexed again in the search database as it can be easily updated on the columnar database only. Hence, maintenance cost is also saved.

The present disclosure also relates to the method as described above. Various embodiments and variants disclosed above apply mutatis mutandis to the method.

The present disclosure further provides a method of retrieving context-based information relating to a search query. The method comprises receiving the search query. Herein, the term "search query" refers to text provided by a user in order to extract relevant information based on context of the search query. Moreover, the relevant information may be pertaining to a field of interest of the user. Furthermore, the relevant information may have data related to one or more keywords of search query included therein. In an example, the search query may refer to a particular biomedical entity, for instance, protein, gene, chemical compounds, disorders, deoxyribonucleic acids and ribonucleic acids. Herein, the method is implemented using a database, the database comprising the columnar database, the ontological database and the search database. The search database is configured to store an inverted index of the plurality of documents in the columnar database, wherein the inverted index stores, corresponding to a given document, a set of concepts identified in the given document, and secondary concepts relating to the given document, wherein a secondary concept has a direct relationship in the network with at least one of the concepts in the set.

The method comprises, identifying at least one concept relating to the search query, using the ontological database. Notably, one or more words or phrases in the search query are compared with the concepts in the ontological database to identify at least one concept relating to the search query. In an example, the search query may be semantically analyzed to identify nouns present in the search query, wherein the identified nouns may be used to identify the at least one concept. Optionally, the semantic analysis of the search query may further provide an intent of the user.

The method comprising identifying at least one document relating to the search query based on the at least one concept relating to the search query, from the columnar database. Notably, using the inverted index of the search database, at least one document corresponding to the at least one concept relating to the search query are identified and such identified at least one document is retrieved from the columnar database to be provided to the user. It will be appreciated that since the inverted index stores secondary concepts relating to a document in the inverted index, the at least one document may relate to a secondary concept.

Optionally, the ontological database is configured to store, corresponding to each of the relationships between the concepts, at least one attribute relating to the relationship and wherein, in an event, a plurality of concepts are identified in the search query, the method comprises identifying at least one document, from the columnar database, relating to the search query further based on attributes relating to the relationships between the plurality of concepts identified in the search query. Herein, the at least one attribute relating to a relationship may be a type of the relationship. Specifically, the type of the relationship indicates a nature of the relationship between the two concepts. In an example, the ontological database related to biomedical entities. In such example, the concepts may be 'Lung Cancer' and 'Docetaxel'. Therefore, the type of the relationship between the two concepts may be 'cures', specifically that, 'Lung cancer' 'cures' 'Docetaxel'. Therefore, the method comprises identifying at least one document, from the columnar database, relating to the search query further based on attributes relating to the relationships between the plurality of concepts identified in the search query. For example, the search query may be analyzed to identify any words or phrases relating to the type of relationships therein and thereafter, such identified words or phrases may be used to identify one or more documents based thereon.

Optionally, the ontological database is configured to store, corresponding to each of the relationships between the concepts, a weightage score of the relationship, wherein in an event, a plurality of concepts are identified in the search query, the method comprises:

identifying a set of documents from the columnar database, relating to the search query based on the plurality of concepts relating to the search query; and ranking the documents in the set based on the weightage scores of relationships between the plurality of concepts.

Optionally, in this regard, when the plurality of concepts are identified in a search query, documents having higher weightage scores between their concepts may be ranked higher, when providing results to the search query. Notably, a higher weightage score of a relationship between two concepts is indicative of a stronger association between the two concepts. Furthermore, weightage score of a relationship between two concepts may be determined based on a frequency of cooccurrence of the two concepts in the plurality of documents. Notably, Breadth First Search (BFS) order is maintained to traverse the tree network topology. In an instance of context-based search, if the search query is 'gene related to lung cancer', wherein the biomedical entity term is 'lung cancer', but the results needed are of the related gene of 'lung cancer'. Herein, the inverted index of the 'lung cancer' is procured. Furthermore, the nearest gene from the shortest path is realized. Notably, only those set of documents are filtered out which are of the required gene asked in the search query.

Optionally, since the data is indexed into multiple nodes of the search database, tree network topology connection between nodes is built which helps in optimal serving of the search query and maintaining faster indexing speed. Additionally, the edges in the ontological database arising from a particular node can be multiple. However, all the edges are not equal. The weightage score is given to the edge in the ontological database of the present disclosure as per life science domain expert experience data. Furthermore, this weightage scores along with other factors decide the most relevant traversal or a method for path selection. Hence, all the weightage score of the node, document frequency decides upon the path to be followed for relevant ranking, relevant realization of relationship based on aggregation and context-based search.

Optionally, the method further comprises:

obtaining a list of top concepts from the ontological database; and ranking the documents in the set based on the list of top concepts.

Optionally, in this regard, the top concepts refer to temporally frequently searched concepts. Notably, the list of top concepts represents trending concepts in a given domain in a given time period. Therefore, documents having one or more of the top concepts may be ranked higher in the search results.

In an embodiment, the method comprises decoupling metadata corresponding to each of the plurality of documents from the plurality of documents, wherein the metadata corresponding to the documents is stored in the search database.

DETAILED DESCRIPTION OF THE DRAWINGS

Referring to FIG. 1, there is shown a block diagram of a system 100 for efficient management of a search database 110 for retrieving context-based information, in accordance with an embodiment of the present disclosure. The system 100 comprises a database 102 and a processor 104. The database 102 comprises a columnar database 106 for storing a plurality of documents, an ontological database 108 configured to represent a plurality of concepts as nodes in a network and relationships between the concepts as edges between the nodes; and the search database 110 configured to store an inverted index of the plurality of documents in the columnar database 106. The processor 104 is configured to identify, using the ontological database 108, a set of concepts in each of the plurality of documents and store, in the search database 110, corresponding to a given document:

the set of concepts identified in the given document; and
secondary concepts relating to the given document, wherein a secondary concept has a direct relationship in the network with at least one of the concepts in the set.

Figure 2:
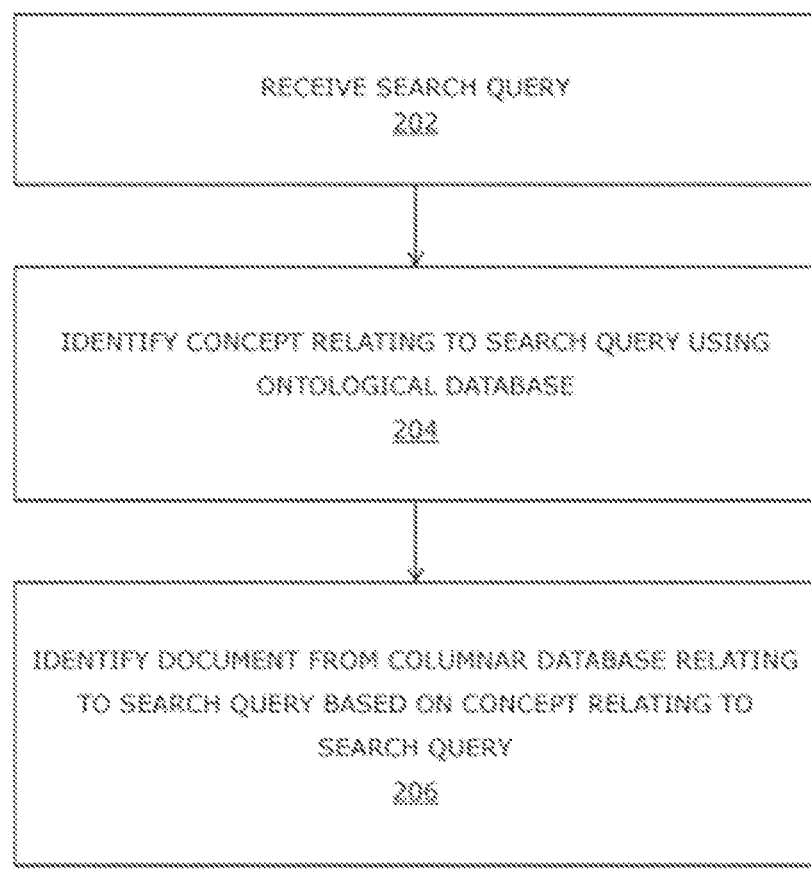
FIG. 2 is a flowchart depicting steps of a method of retrieving context-based information relating to a search query, in accordance with an embodiment of the present disclosure.

Referring to FIG. 2, there is shown a flow chart depicting steps of a method of retrieving context-based information relating to a search query, in accordance with an embodiment of the present disclosure. The method is implemented using a database comprising a columnar database, an ontological database, and a search database configured to store an inverted index of the plurality of documents in the columnar database, wherein the inverted index stores, corresponding to a given document, a set of concepts identified in the given document, and secondary concepts relating to the given document, wherein a secondary concept has a direct relationship in the network with at least one of the concepts in the set. At step 202, the search query is received. At step 204, at least one concept relating to the search query is identified using the ontological database. At step 206, at least one document is identified, from the columnar database, relating to the search query based on the at least one concept relating to the search query.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for efficient management of a search database for retrieving context-based information, the system comprising a database and a processor, wherein the database comprises:
    a columnar database for storing a plurality of documents;
    an ontological database configured to represent a plurality of concepts as nodes in a network and relationships between the concepts as edges between the nodes; and
    the search database configured to store an inverted index of the plurality of documents in the columnar database;
wherein the processor is configured to identify, using the ontological database, a set of concepts in each of the plurality of documents and store, in the search database, corresponding to a given document:
    the set of concepts identified in the given document; and
    secondary concepts relating to the given document, wherein a secondary concept has a direct relationship in the network with at least one of the concepts in the set.

2. The system of claim 1, wherein the ontological database is configured to store, corresponding to each of the relationships between the concepts, at least one attribute relating to the relationship.

3. The system of claim 1, wherein the ontological database is configured to store, corresponding to each of the relationships between the concepts, a weightage score of the relationship.

4. The system of claim 1, wherein the processor is configured to establish communication and networking between the columnar database, the ontological database and the search database.

5. The system of claim 1, wherein the processor is configured to decouple metadata corresponding to each of the plurality of documents from the plurality of documents, wherein the metadata corresponding to the documents is stored in the search database.

6. The system of claim 1, wherein the ontological database is represented in a tree network topology as the network.

7. A method of retrieving context-based information relating to a search query, wherein the method is implemented using a database, the database comprising:
    a columnar database for storing a plurality of documents,
    an ontological database configured to represent a plurality of concepts as nodes in a network and relationships between the concepts as edges between the nodes, and
    a search database configured to store an inverted index of the plurality of documents in the columnar database, wherein the inverted index stores, corresponding to a given document, a set of concepts identified in the given document, and secondary concepts relating to the given document, wherein a secondary concept has a direct relationship in the network with at least one of the concepts in the set;
wherein the method comprises
    receiving the search query;
    identifying at least one concept relating to the search query, using the ontological database; and
    identifying at least one document, from the columnar database, relating to the search query based on the at least one concept relating to the search query.

8. The method of claim 7, wherein the ontological database is configured to store, corresponding to each of the relationships between the concepts, at least one attribute relating to the relationship and wherein, in an event, a plurality of concepts are identified in the search query, the method comprises identifying at least one document, from the columnar database, relating to the search query further based on attributes relating to the relationships between the plurality of concepts identified in the search query.

9. The method of claim 7, wherein the ontological database is configured to store, corresponding to each of the relationships between the concepts, a weightage score of the relationship, wherein in an event, a plurality of concepts are identified in the search query, the method comprises:

identifying a set of documents from the columnar database, relating to the search query based on the plurality of concepts relating to the search query; and ranking the documents in the set based on the weightage scores of relationships between the plurality of concepts.

10. The method of claim 9, wherein the method further comprises:

obtaining a list of top concepts from the ontological database; and ranking the documents in the set based on the list of top concepts.

11. The method of claim 7, wherein method comprises decoupling metadata corresponding to each of the plurality of documents from the plurality of documents, wherein the metadata corresponding to the documents is stored in the search database.

* * * * *